Jan. 30, 1940.    P. MESSINGER    2,188,513
SPECTACLE MOUNTING
Filed Sept. 15, 1938

INVENTOR.
Peter Messinger.
BY
Harry Langsam
ATTORNEY.

Patented Jan. 30, 1940

2,188,513

UNITED STATES PATENT OFFICE 2,188,513

SPECTACLE MOUNTING

Peter Messinger, Philadelphia, Pa.

Application September 15, 1938, Serial No. 230,065

1 Claim. (Cl. 88—47)

My invention relates to eyeglasses and relates particularly to the mountings for frameless spectacles.

Heretofore, rimless eyeglasses have had temple mountings which consist of a bifurcated strap portion receiving a portion of one of the eyeglass lens and a holding bolt passing through the free ends of the bifurcated strap of the mounting as well as an aligned complementary opening in the lens. The temple mounting generally has an integrally formed crescent-shaped strap which engages a portion of the rim of the lens to eliminate wobbling of the mounting about the holding bolt as a pivot. Vibration will cause the mounting to break the glass lens unless the mounting is held firmly. On occasions when the holding bolt is drawn too tightly, the lens also may be cracked. Because the ends of the rim strap and the holding bolt form a three-point positioning unit on the lens, any variation of the ends of the rim strap from a predetermined position incorrectly positions the entire mounting.

Furthermore, any bending of the ends of the mounting strap from their predetermined position prevents the rim of the lens from being firmly held by the strap.

It is, therefore, an object of my invention to provide a temple mounting which has an adjustable crescent-shaped strap.

A further object of my invention is to provide a mounting for rimless eyeglasses wherein the rim strap does not differ in any material appearance from the customary strap irrespective of whether the mounting is used on the temple or the nose bridge.

A further object of my invention is to provide a separably adjustable rim strap which will be moved by a universal connection between itself and the tensioning screw.

It is also well known that all eyeglass lens are not circular, and because of their non-circular shape, the rim strap must have its ends turned to conform to the shape of the rim against which it abuts. Therefore, it is desirable to have a rim strap which may universally seat itself upon rims of irregular curvatures.

Therefore, it is another object of my invention to provide a mounting for rimless eyeglasses wherein the rim guard is adapted for rims of irregular curvatures.

Other objects of my invention are to provide an improved device of the character described, that is easily and economically produced, and which is sturdy in construction.

With the above and related objects in view, my invention consists in the following details of construction and combination of parts as will hereinafter be more readily understood when the description is read in conjunction with the accompanying drawing, in which—

Figure 1:
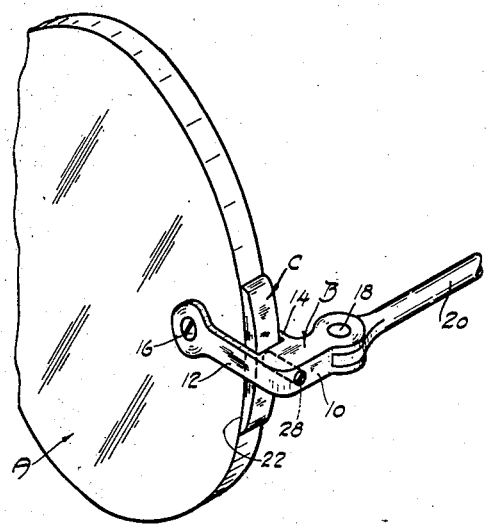
Fig. 1 is a fragmentary view of an eyeglass lens embodying my invention.

Referring now in particular to the drawing, I show a rimless eyeglass lens, generally designated as A, having a temple mounting, generally designated as B.

Although the description set forth is applicable to a temple mounting, it is equally well applicable to the nose bridge mounting.

The temple mounting B has a body portion 10 from which extends parallel straps 12, 14 that are adapted to engage a portion of each of the front and the back surfaces of the lens. A holding bolt 16 passes through the free ends of the straps 12, 14 as well as through an aligned opening in the lens A. When the bolt is tightened, the straps are tightened against the lens, thus holding the mounting in a position whereby it may be oscillated about the holding bolt 16 as a pivot. From another side of the body of the mounting is a vertically positioned pivot 18 holding an ear temple piece 20 in position. The ear temple piece is of the customary type now in common use.

Each of the straps 12, 14 are of a length to enable a rim strap, generally designated as C, to be placed therebetween. The rim strap C may be crescent-shaped, or it may take on any desirable shape, but one side 22 should preferably conform to the general shape of the portion of the rim against which it abuts. A central circular tapered recess or opening 24 in the rim strap C is adapted to receive a tapered point 26 of a screw 28 which passes through a threaded bore in the body of the mounting. The interfitting recess 24 and taper 26 serve as a universal connection whereby the rim strap may properly seat itself on the rim of the lens; and when the screw 28 is properly tightened, the body of the mounting cannot oscillate about the holding screw or bolt 16. Thus, when the bolt 16 is in position, the rim strap can be independently adjusted.

This independent adjustment of the rim strap enables the optician to properly tighten the holding screw without the necessity of adjusting the rim strap and later to properly tension the rim guard by turning the screw 28. The point on the screw 28 interfitting in the rim strap opening prevents the rim strap from moving upwardly or downwardly.

Figure 3:
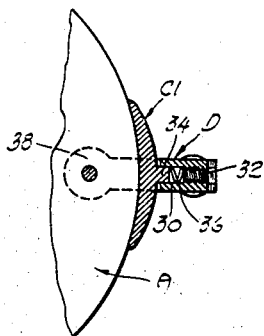
Fig. 3 is a modification of my invention wherein a spring-pressed rim strap is supported by the main body of the mounting.
Figure 2:
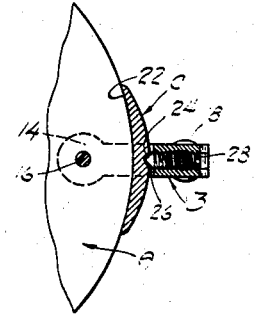
Fig. 2 is a sectional view through the mounting illustrated in Fig. 1.

As a modification of my invention, I show in Fig. 3 a mounting for the eyeglass lens, generally designated as D, wherein there is a horizontally positioned bore 30. The front portion of the bore is smooth, and the rear portion is screw-threaded to receive a screw 32. A rim strap, generally designated as C1, is crescent-shaped, and it has a horizontally positioned stud 34 which fits into the smooth portion of the bore 30. Within the bore 30 between the end of the stud 34 and the end of the screw is a V-shaped spring 36. The tension of the spring 36 on the rim strap prevents undue pressure on the lens, and it may be controlled by loosening or tightening the screw 32.

The rim strap C1 is prevented from moving upwardly or downwardly by virtue of the stud 34 being in the bore 30, and it is prevented from rotating by virtue of the lens straps, only one of which is shown and which is designated as 38.

Heretofore in the prior art devices when the lenses wobble, the optician must remove the holding screw and bend the rim strap with the aid of pliers; whereas with my invention, the optician only needs to tighten or adjust the rim strap screw 28.

My invention also provides a rim strap firmly fitting against the edge of the rim in those cases where the bolt opening through the lens is drilled in an incorrect position. As an example, if the bolt hole in the lens should be drilled too near the rim and an integrally combined strap and mounting of the old type of construction is used, then the rim strap must be bent with the aid of pliers; otherwise, a wide gap between the rim and the rim strap will result. If the bolt hole should be too far away, then the rim strap could be thinned to suit the occasion.

To prevent rotation of the rim strap C1, its stud and interfitting bore may be irregular or polygonal in shape.

Although my invention has been described in considerable detail, such description is intended as illustrative rather than limiting, since the invention may be variously embodied, and the scope of the invention is to be determined as claimed.

I claim as my invention:

A mounting for rimless glasses comprising a temple member having spaced arms, said arms being pivotally connected to a lens, a separable rim strap adapted to be held between the rim of the lens and the temple member, and means universally joining said rim strap and said temple member whereby the rim strap may adjust itself on the rim of said lens, said means comprising an interfitting tapered recess and a threaded screw having a tapered point, said screw threaded in said temple member and being adapted to adjustably press said rim strap against the lens rim whereby the lens will be supported sturdily and uniformly along its rim, and said rim strap being limited in movement in a direction along the rim of the lens, said tapered point contacting the bottom of said tapered recess in a point engagement.

PETER MESSINGER.